US007679507B2

(12) United States Patent
Babich et al.

(10) Patent No.: US 7,679,507 B2

(45) Date of Patent: Mar. 16, 2010

(54) VIDEO ALARM VERIFICATION

(75) Inventors: Thomas S. Babich, Glen Cove, NY (US); Dean Mason, Plainview, NY (US)

(73) Assignee: Honeywell International Inc., Morristown, NJ (US)

(*) Notice: Subject to any disclaimer, the term of this patent is extended or adjusted under 35 U.S.C. 154(b) by 282 days.

(21) Appl. No.: 11/749,371

(22) Filed: May 16, 2007

(65) Prior Publication Data

US 2008/0284580 A1 Nov. 20, 2008

(51) Int. Cl.

| | |
|---|---|
| ***G08B 29/00*** | (2006.01) |
| ***G08B 23/00*** | (2006.01) |
| ***G08B 1/08*** | (2006.01) |
| ***G08B 13/00*** | (2006.01) |
| ***G08B 13/08*** | (2006.01) |
| ***H04N 7/18*** | (2006.01) |

(52) U.S. Cl. .................. 340/539.16; 340/506; 340/507; 340/539.22; 340/539.18; 340/541; 348/143; 348/144; 348/145; 348/146; 348/147

(58) Field of Classification Search ................ 340/506, 340/507, 531, 541, 539.11, 539.16, 539.22, 340/545.1, 545.3, 527; 348/143–155

See application file for complete search history.

(56) References Cited

U.S. PATENT DOCUMENTS

| | | | |
|---|---|---|---|
| 6,400,265 B1 | 6/2002 | Saylor et al. | |
| 6,661,340 B1 | 12/2003 | Saylor et al. | |
| 6,798,344 B2 * | 9/2004 | Faulkner et al. | 340/541 |
| 6,847,293 B2 * | 1/2005 | Menard et al. | 340/539.1 |
| 6,956,313 B2 | 10/2005 | El-Gabry et al. | |
| 6,960,998 B2 * | 11/2005 | Menard et al. | 340/539.19 |
| 7,113,090 B1 | 9/2006 | Saylor et al. | |
| 7,253,728 B2 * | 8/2007 | Johan et al. | 340/531 |
| 2002/0057342 A1 * | 5/2002 | Yoshiyama et al. | 348/153 |
| 2006/0239645 A1 | 10/2006 | Curtner et al. | |
| 2007/0205888 A1 * | 9/2007 | Lee et al. | 340/539.18 |

* cited by examiner

*Primary Examiner*—Benjamin C Lee
*Assistant Examiner*—Lam P Pham
(74) *Attorney, Agent, or Firm*—Husch Blackwell Sanders Welsh & Katz

(57) ABSTRACT

A method for monitoring an alarm zone within a perimeter, border and/or building includes capturing video image data of an alarm event detected in the alarm zone, and automatically establishing a cell phone session with an end-user to verify a true or false nature of the detected alarm. The end-user may use the cell phone display to review the video during the cell phone session, and may use the cell phone's key for the verifying. The novel monitoring method with end-user alarm event verification avoids false alarms being raised where the nature of the detected alarm event is false, and the verifying occurs before a false alarm is raised/communicated.

26 Claims, 5 Drawing Sheets

VIDEO ALARM VERIFICATION

BACKGROUND OF THE INVENTION

The present invention relates to security systems, and more particularly relates to a centralized security and alarm system, and related method, which automatically provides video or still images of detected alarm events occurring within monitored alarm zones in a protected building, perimeter or premises, for example, a home or business, to a designated end-user cell phone to enable the end-user to view the captured alarm event activity and verify whether the alarm event is a true or false alarm event. The automatic communication and end-user response preferably occur before an alarm notification is communicated to a security and alarm system central monitoring station.

Security and personal safety are major concerns for individuals, and their loved ones. Most homeowners wish to protect their valuables and maintain safe havens for themselves and their family members. To that end, various conventional central security and alarm systems are known that provide various security system monitoring and surveillance features and options to protect the homes, homeowners, and family members and visitors. For example, centralized security and alarm systems are known to include video monitoring for one or more entry and exit points at the home or business location.

Conventional central security and alarm systems operate as follows. An alarm event detection device protecting an alarm zone, e.g., a front door, may detect an alarm event, i.e., an unauthorized opening of the door. The detection is communicated by the detection device to a local central home panel, or server. The central panel, in response to receipt of detection notification, and typically after some fixed alarm-entry delay (where the alarm is not cancelled), transmits an alarm notification (signal) to the central monitoring station. The alarm notification indicates to the central monitoring station that a true alarm event occurred, e.g., that there has been a detected unauthorized entry at an alarm zone at the protected premises. The central station may then alert the local authorities and/or third party security companies, who then take appropriate action with respect to the detected unauthorized entry.

Alarm event detection devices include but are not limited to window detectors, door detectors, motion sensors, both digital and analog (CCTV) image or acquisition devices and cameras. Conventional alarm event detection devices, however, are known to be limited in ability to distinguish or verify that an alarm event is a false alarm event before raising a true alarm event notification. For that matter, centralized security and alarm systems frequently interpret alarm events that are false alarm events as true alarm events. One example of this might occur where an alarm event detection device detects an alarm event at a protected premises as an intrusion where the alarm event was a family member triggering an intrusion detection device, and the central panel or central monitoring station raises a false alarm. Other false alarm triggering events might include pets or unexpected visitors breaching a protected entry or exit zone, falling branches detected as intrusions, loud noises generated by car crashes, windows breaking, and many other innocent and inadvertent occurrences. The problem is that when an alarm state is communicated to the central monitoring station, whether false or true, action must be taken.

Conventional central security and alarm systems may include attempting to contact a homeowner at the secured premises in response to a reported detected alarm event. A problem with such operation, however, occurs where the contact person or homeowner is not available, or not available within the moments just after the alarm event is detected and before an alarm is raised. In such a case, the homeowner cannot verify or communicate to the central station that the detected alarm event was a false alarm event (so that no action need be taken). For that matter, common power failures and other power cutoffs may prevent traditional central security monitoring and alarm systems from contacting the designated contact person in the event of a reported detected alarm event or security breach.

The high false alarm rates associated with conventional central security and alarm systems, and alarm event reporting pose a serious problem in communities where homes and business are protected with such conventional systems. False alarms reported from conventionally protected homes and businesses deplete police resources and undermine the credibility of the security and alarm systems that appear to repeatedly malfunction. In response to the staggering number of false alarms (over 90% in some areas), local police departments and other governmental entities may fine homeowners whose alarm systems repeatedly produce false alarms in an attempt to reduce the false alarm reporting rates. Some US communities have gone as far as passing laws that prevent the police from responding to an alarm activated by a central "home" security and alarm system. As a result, central security and alarm system owners are sometimes forced to employ expensive third party security companies to respond to reported alarm conditions and events.

Certain central security and alarm systems are known to provide means for minimizing or reducing the numerous false alarms reported. One example is a central security and alarm system that allows the system's central monitoring station to respond to reported (detected) alarm events with attempts to verify whether the event is a true or false alarm event. That is, such systems and operations are responsive in that in response to a reported detected alarm event, central station security personnel notified attempt place a confirmation call to the homeowner in an attempt to verify the alarm event before dispatching police or other security personnel to investigate. Such communications may be helpful when the owner is at home, allowing him/her to verify, if possible, whether the alarm event triggering the notification was inadvertent or accidental (false), or true alarm event detection. But as mentioned above, if the homeowner is not present verification cannot occur.

For example, U.S. Pat. No. 6,400,265 to Saylor, et al. ("the '265 patent"), discloses a security system and method that provides for end-users to personalize alert notifications for various security devices including access to a web interface (e.g., a personal web page), where an end-user may monitor current security status and other information. Historical data (aggregate data from security systems), and data from other sources may be available at such a website for generating reports based on the aggregate data, and/or other sources of data. Users may register security devices and/or systems with a central security monitoring station which then accesses the user's personal preferences, profile information and/or other information used to execute alarm event notifications, investigations, reporting, etc.

Certain central security and alarm systems include the use of image acquisition devices, e.g., network cameras, for surveillance or monitoring alarm zones that are particularly susceptible to breach. Acquisition devices or network cameras may continuously monitor and transmit acquired video and still images from a protected alarm zone to a central monitoring station. In other known systems the image acquisition devices acquire alarm zone images only upon alarm event detection. Central monitoring stations, or central stations are known to use the acquired video or image information for various forms of video alarm verification.

For example, if a trip wire (alarm event detection device) in a video-monitored alarm zone is triggered, the trip wire device sends an alarm event detection signal to the local central panel, and/or directly to a network camera monitoring the alarm zone to trigger the camera to acquire video of the alarm event as it occurs. The camera acquires and transmits images of the alarm event to the central home panel. With or without a time delay, or alarm entry delay, the central panel sends alarm notification to the central monitoring station. In response, security personnel at the central station may use the video in an attempt to remotely verify whether an actual intrusion, or some other true alarm event has occurred. To do so, the image information may be sent by the central station security personnel to the end-user via the Internet, telephone, etc.

However, because notification of the alarm condition to the central station occurs prior to video being sent to the user, or to the user's website for verification, the operation is susceptible to high false alarm reporting, and the associated complications discussed above. Moreover, because such central security monitoring and alarm systems are not known to map alarm zones with respective video cameras, it is difficult for security personnel to identify and review the "right" video clip, or still shot, of the captured alarm event before alarm entry delays time-out, particular in a zone or premises utilizing multiple cameras. That is, by the time the correct video segment is found and viewed to verify a reported alarm event, alarm notification has typically already occurred. Moreover, even where prompt video analysis is available by central security monitoring personnel, the availability may still not guarantee that the central station personnel can distinguish friends from foe, i.e., identify that the event viewed is not a true alarm event. The security monitoring persons reviewing video clips of alarm events cannot discern identities but only whether the alarm event was human triggered, and therefore cannot "know" whether an "intruder" is the homeowner, a child, a child's nanny, a janitor or other service provided, etc.

Accordingly, and because home entry/exit security breaches reported represent 75% of all false alarms, a more efficient and effective method and system for verifying alarm events before formal alarm notification takes place would be welcomed in the security world, particularly if effective in reducing percentages of false alarms reported.

SUMMARY OF THE INVENTION

To that end, the present invention takes advantage of the fact that most end-users of central security and alarm systems own cell phones, and have knowledge of the occupants of and visitors to a protected home or premises. The present invention utilizes the accessibility provided by cell phone communicating and cell phone end-user knowledge by automatically contacting an end-user and forwarding to the end-user an image of a captured alarm event to verify with the cell phone whether the detected and video-captured alarm event is a true or false alarm event. The video data sent may be sent in any form known to the skilled artisan for sending video to a designated cell-phone, or other hand-held wireless communication device. The verification occurs preferably before communicating formal notification of the detected alarm event to a central monitoring station or other concerned persons or organizations.

In one embodiment, the invention includes a central home panel connected to a number of alarm event detection devices, and video monitoring devices at home or business premises. At detection of an alarm event by an event detection device, a video monitoring device acquires video of the event and automatically opens a communication session with an end-user cell phone designated. When the cell phone session is established, the central panel sends the acquired video to the end-user, e.g., by email to the cell-phone, for the user to view the video and respond by communicating or verifying the nature of the detected event. The system maintains the open session with the cell phone, keeping the end-user on the line until verification is complete, preferably prior to the timing out of the fixed alarm entry delay. The central panel, however, may extend the alarm entry delay before reporting the detected alarm event to the central station, for example, if the session is established before the initial entry delay times out. That is, fixed alarm entry delays may be extended by the invention for some time beyond the fixed alarm-entry delay period, for example, until a response is received from the end-user.

If the end-user verifies by cell phone that the detected alarm event is a false alarm event before the time out of the alarm entry delay, alarm notification to the central station is cancelled. For that matter, the inventive method provides that a new message may be sent by the central panel to the central station indicating that an alarm event was detected, that alarm notification was sent, that the alarm event was verified by an end-user cell phone to be a false alarm event, and the alarm "cancelled" by the user.

In another embodiment, the invention includes a central security monitoring and alarm system, and method that protects one or more alarm zones comprising alarm event detection devices and video or image acquisition devices. The alarm event detection devices and video acquisition devices are in communication with a home central panel, where the acquisition devices capture any detected alarm event occurrences in the alarm zones. The alarm event detection devices may be part of the video monitoring devices. In more detail, when an alarm detection device is triggered, the detection is automatically communicated to the central panel, which enters an alarm entry delay, as the video monitoring device acquired video of the event as it is occurring. The central panel automatically initiates a communication session with the end-user cell phone in order that the designated cell-phone end-user verifies the nature of the alarm event.

Upon successful connection with the end-user cell phone, the central panel will automatically forward some part of the acquired video to the end-user, e.g., a still image by email communication. The central station may further extend the alarm entry delay, while communicating to the end-user in an effort to have the end-user verify. The end-user may clear or verify the nature of the alarm event using the cell phone keypad. If the alarm event is determined to be false, and is cleared by the end-user keypad prior to the alarm entry delay expiring, alarm notification is cancelled, and the cell phone session with the end-user is ended (disconnected from the central panel).

But if the entry delay is violated before the end-user can use the keypad to cancel the alarm notification (in a case of a false alarm event), the central panel may nevertheless maintain the session but still send the video, and prompts the end-user to verify the alarm event and/or cancel the alarm notification using the different cell phone keys. So if the alarm event is thereafter verified as false, the central panel suppresses the alarm, and any alarm notification communication to the central station. The central panel may then send a new message to the central station informing the central station of the particulars of the alarm event detection, and verification and cancellation by the end-user via the cell phone.

In an alternative embodiment, the invention includes a central security and alarm system that establishes one or more alarm zones with alarm event detection devices and a video or image acquisition device positioned to capture alarm event occurrences. The detection and video acquisition devices communicate locally to a central home panel. Upon receipt at the central panel of a signal from a detection device indicating that an alarm event has been detected, the central panel, or the detection device triggers the video acquisition device monitoring the alarm zone to acquire video or still images of the alarm event. The central panel notifies the central station of the alarm event. The central station conducts a preliminary verification to determine whether the alarm event is true or false, and attempts to establish a cell phone session with the end-user in an effort to have the end-user view and verify the nature of the video captured alarm event. The end-user may then make a more detailed verification. If the end-user further verifies the alarm event, e.g., using the cell phone keypad, the central station may cancel any further alarm notification and attempt to retract the false alarm.

The invention further includes the use of a video map, or video zone list that maps alarm zones to video cameras present and operational in such alarm zones. Doing so requires generating and maintaining a video zone list to link or identify video cameras with their respective alarm zones, and use of the video zone list by the home central panel and/or central station security personnel to immediately identify the camera that captured the alarm event, and therefore immediately access the video acquired by the camera. That is, if an alarm event is detected, the central panel and/or central station uses the a video zone list to identify the source video acquisition device associated with said alarm zone detection to expediently access and view the captured video event, or forward some portion of it to an end-user cell phone for verification. The list preferably includes all alarm event detection and video acquisition devices present in each of the alarm zones at a monitored home location, or other protected premises.

BRIEF DESCRIPTION OF THE DRAWING FIGURES

Figure 4A:
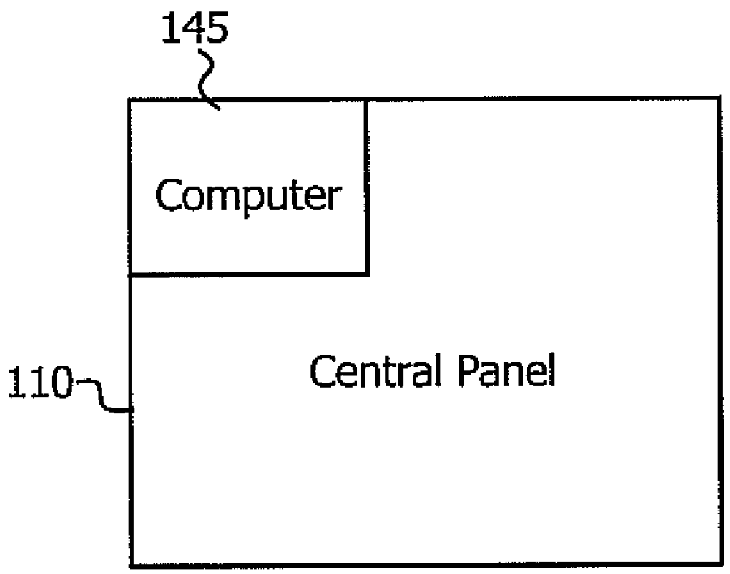
Figure 4B:
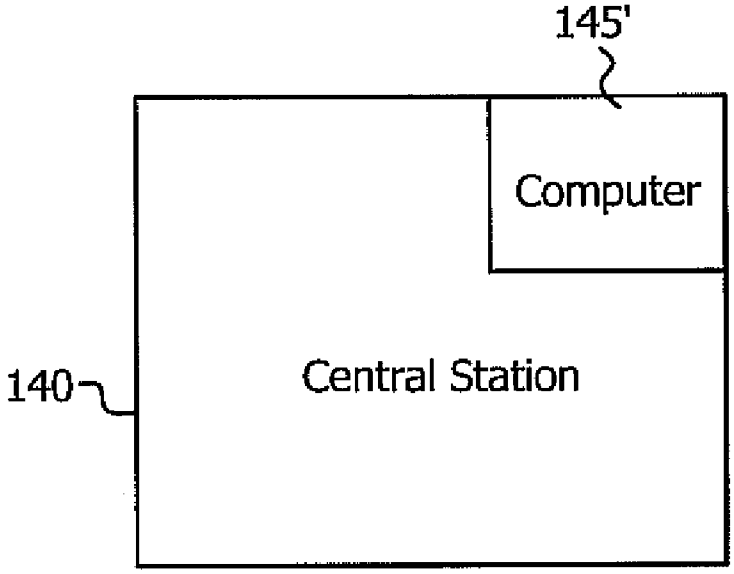
Figure 5:
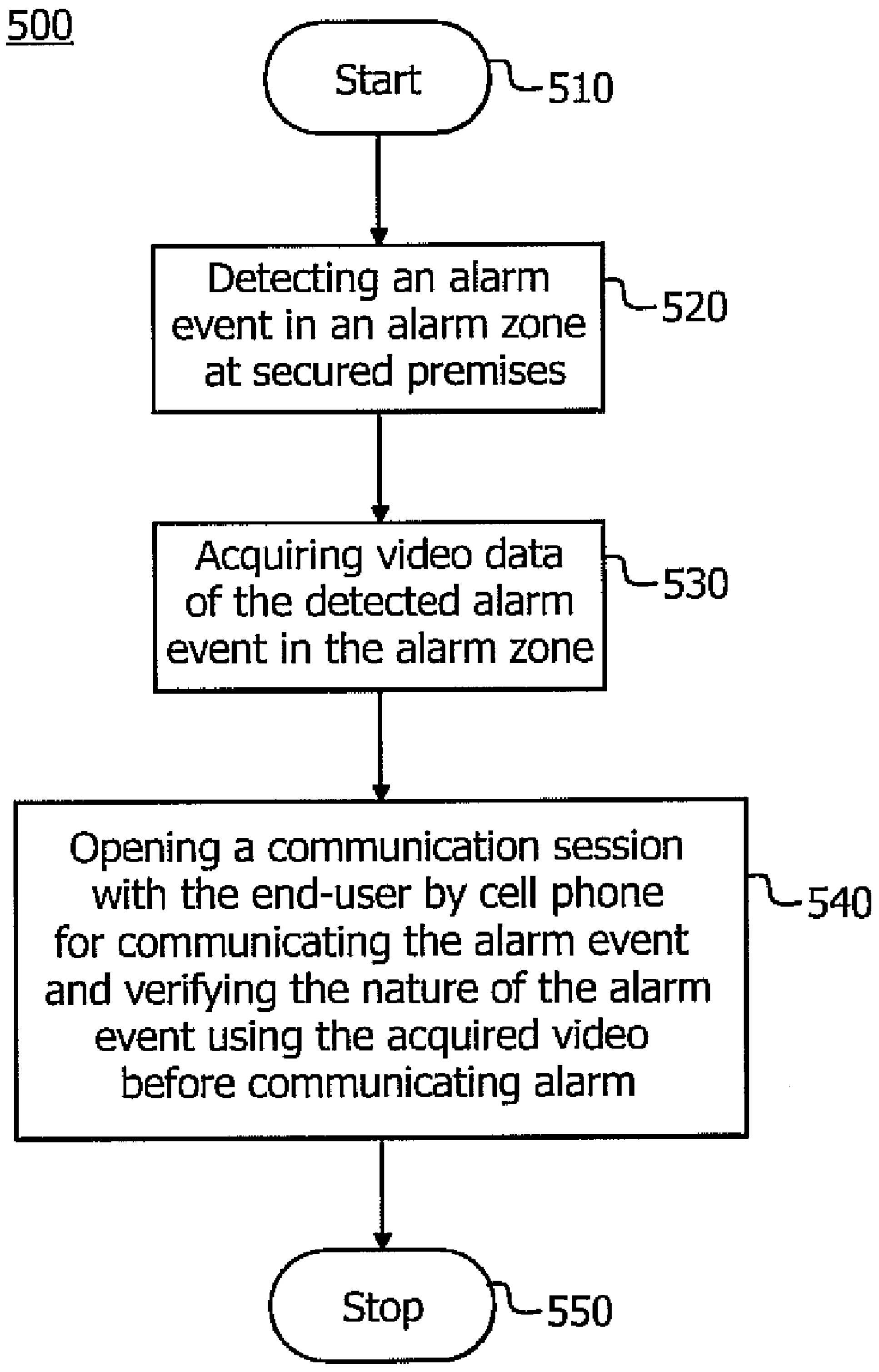

FIGS. 4*a* and 4*b* depict computers or microprocessor that may be programmed to carry out the invention when positioned at the local control panel and the central station, respectively; and FIG. 5 is a flow chart depicting a method of the invention.

DETAILED DESCRIPTION OF THE PREFERRED EMBODIMENTS

The present invention includes a novel home central security and alarm system that automatically verifies detected alarm events via an end-user cell phone session, and novel method for carrying out such video verification. The invention may be implemented in existing or legacy centralized security and alarm systems, as well as in new system designs. The invention relies on the use of alarm event detection devices, and video monitoring devices (e.g., digital cameras) for monitoring particular alarm zones in protected premises, e.g., alarm zones at the entry and exit points of the premises. The video monitoring devices are arranged in the alarm zones to capture video or still images of alarm events detected by the alarm event detection devices. Video acquisition may be triggered by alarm event occurrence, or the acquisition device may be arranged to continuously monitor the alarm zone (s).

Figure 1:
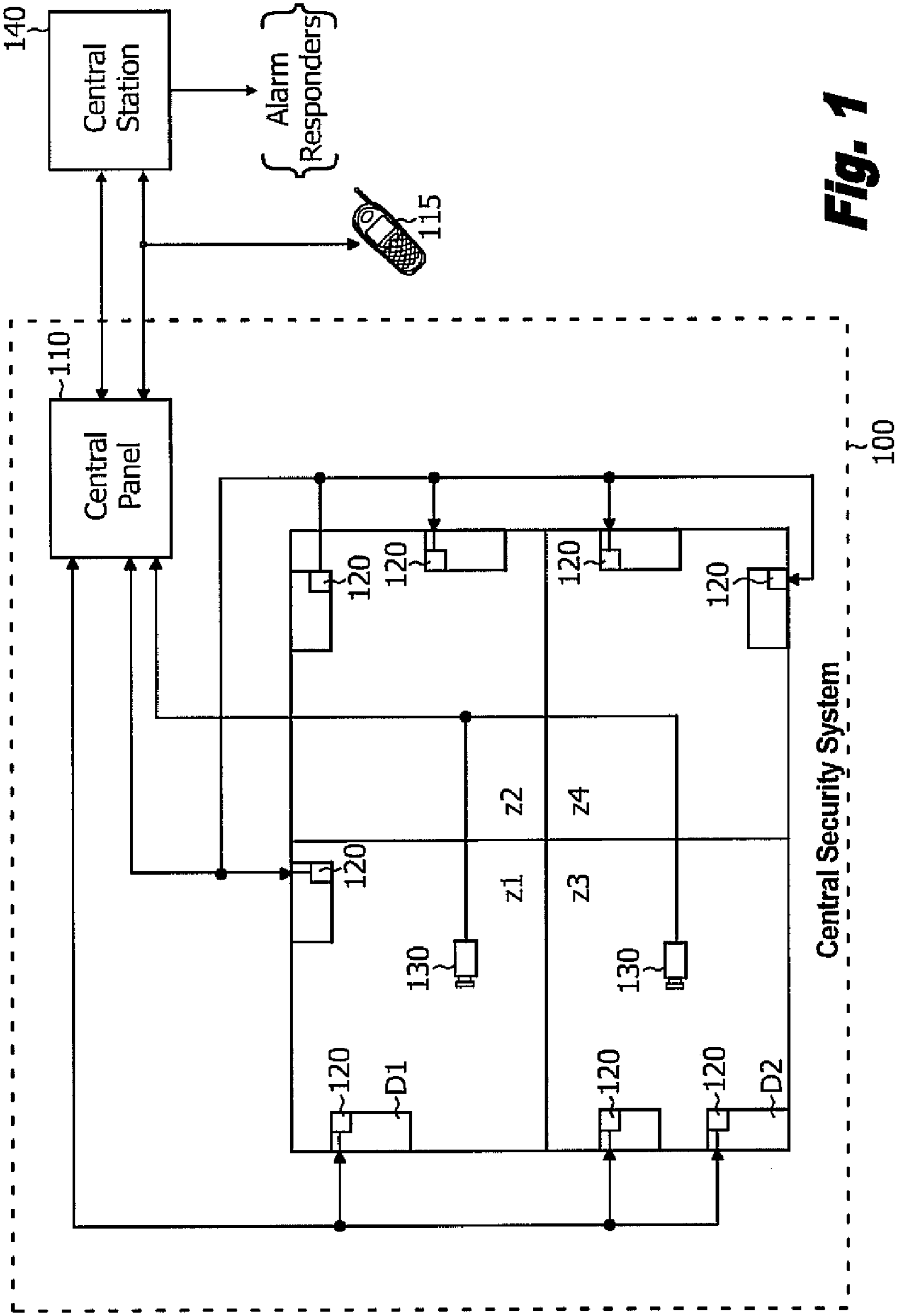
FIG. 1 is a system diagram of one embodiment of a central security monitoring and alarm system of the invention.

An exemplary embodiment of the central security monitoring and alarm system 100 of the present invention that includes the novel end-user verification of detected alarm events using an end-user cell phone session is shown in FIG. 1. Central security system 100 includes a central panel 110, connected to or in communication with a number of alarm event detection devices 120. Alarm event detection devices 120 are arranged at location in any of four home alarm zones, z1, z2, z3 and z4, in the FIG. 1 embodiment. Central security system 100 includes at least two video monitoring devices or network cameras 130 that are disposed in zones z1 and z2, respectively. The network cameras 130 are arranged at the respective alarm zones (z1, z2) to focus upon areas proximate particular alarm detection devices location D1 and D2, as shown. D1 and D2 are home entry and exit points. If an alarm event such as an unauthorized entry detected by device D1 in zone z1 and monitored by network camera 130, the camera acquires video or still images of the detected alarm event. The network camera may be automatically responsive to the actual detection signal generated by D1, or to a signal communicated to the network camera from the central panel at alarm event detection.

When the central panel 110 receives notice of the detected alarm event, it initiates an alarm entry delay and attempts to initiate a session with an end-user cell phone (115) for verification before the entry-delay times out. If the session is opened, the captured video, that is, some portion of the captured video, is forwarded to the end-user cell phone. At the same time, central security system 100 prompts the cell-phone user to verify whether the detected alarm event was merely an entry/exit error or a true breach or intrusion. The end-user may then clear the alarm event thereby cancel ling the alarm notification. Preferably the cancellation is implemented directly by the end-user pressing various keys on the cell phone. The reader should note, however, that other modes of communication are available to an end-user for canceling an alarm notification without deviating from the intended inventive scope.

If the alarm is cancelled, central security system 100 then suppresses any alarm notification related to the entry/exit error or detected alarm event. If an alarm report was communicated from the central security monitoring station before end-user cancellation (that is, verification that the event was a false alarm event), system 100 cancels any such alarm verification report transmission. The central panel 110 may then communicate a new central station ID message, indicating to a central monitoring station manager monitoring communications generated by one or many home central security systems that an alarm was raised in response to a detection error or false alarm event, and that the error was verified as false and canceled by the end-user. Particulars such as home system identification, alarm zone identification, times, dates, security personnel involved, end-user identity, cell phone account ID can be included in the message.

If the entry/exit delay is violated before the cell phone session is established, or after establishing the session but before the end-user receives the video for verification, the inventive system nevertheless sends the captured video alarm event data to the end-user. If the user then cancels or verifies that the alarm event was not a breach, or true alarm event, remedial measures may be taken to retract the alarm notification, notify to all interested parties that the alarm raised was indeed a false alarm, and not investigatory action need be taken to follow through.

In another embodiment, the invention includes a method for generating and making use of a video map of the security system locations (i.e., alarm zones) monitored by dedicated video monitoring devices. To do so, the method includes creating a "video zone list" that maps alarm zones to the video cameras slated to monitor therein. The video zone list is instrumental for promptly identifying the video-monitoring device that captures an alarm event in an alarm zone, thereby promptly accessing the captured video there. Such prompt video identification and access is particularly useful where alarm zone is monitored by multiple video monitoring devices because time is of the essence at an alarm event detection. That is, the video zone list allows a system and operators to quickly identify and access acquired video for end-user verification purposes, preferably before an alarm entry delay runs.

The identified video or still photos may be automatically transmitted directly from the acquisition device 130 to the central panel 110, to the central station 140, or to the end-user via the cell phone session. However, it is preferable that the local central panel 110 automatically controls the manner and timing of transmission of acquired video, and any cell phone section with the end-user for verification of the nature of the alarm event. More, the novel video zone list lists all home alarm zones such as perimeter entry/exit zones, identifies any security detection devices in the alarm zones, and identifies sub-zones in an alarm zones and the video monitoring therein for monitoring sub-parts of the alarm zone, or sub-alarm zone.

Figure 2:
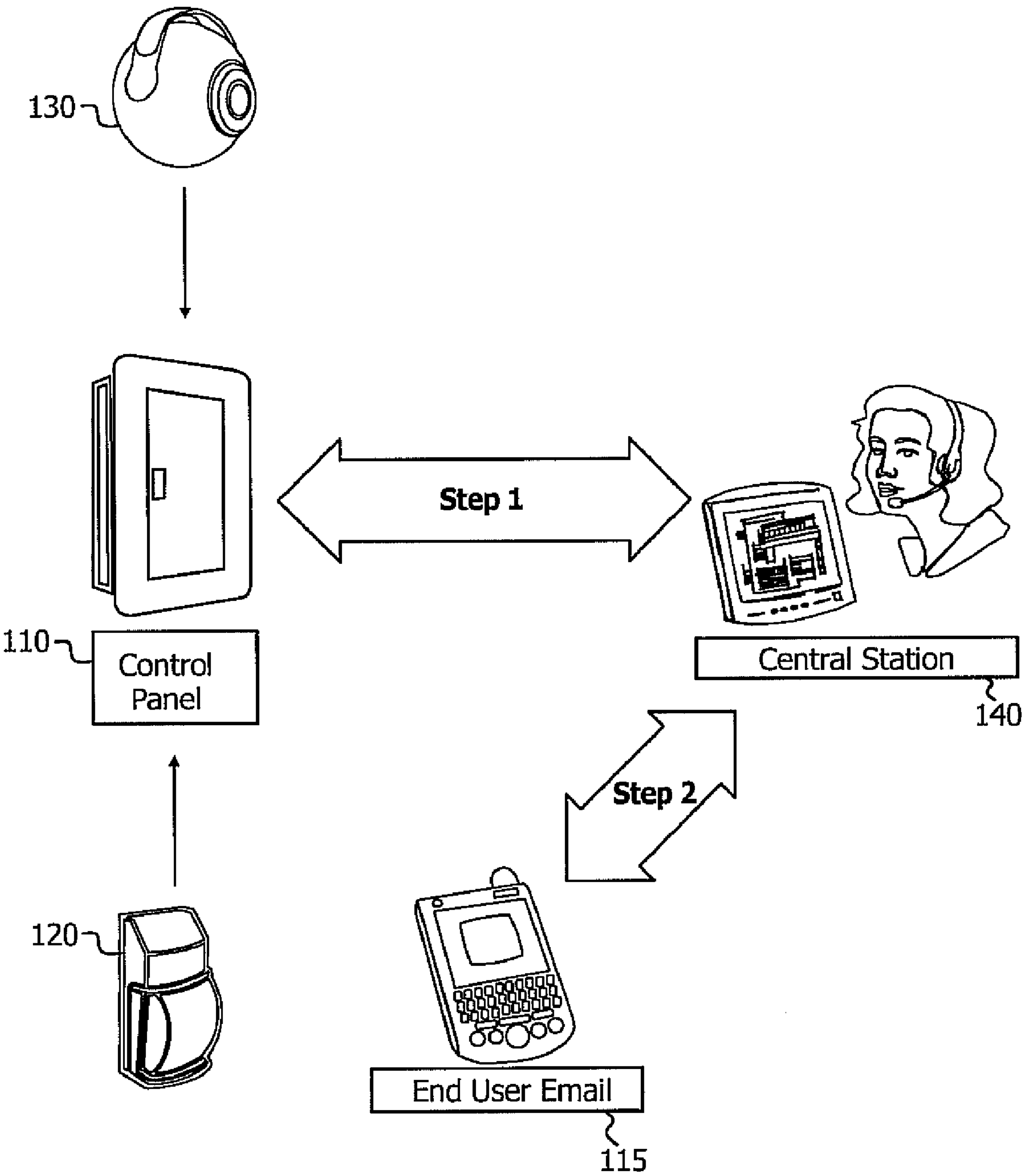
FIG. 2 is a system level diagram depicting on embodiment of a method of practicing the invention to verify detected alarm events.

Exemplary methods of the invention will now be described with respect to FIGS. 2 and 3. FIG. 2 highlights operation of an alarm event detection device 120, a video camera 130, a control panel 110, a cell phone 115 and a central station 140, which together operate in accordance with the invention. Upon detection of an alarm event, e.g., an entry/exit security breach or error, by detection device 120, the detection is communicated to the central home panel. Concurrently, the video monitoring device automatically acquires and captures the video of the monitored entry/exit error event (video from the alarm zone). The event detection and captured video are automatically forwarded to the central station 140, where security monitoring personal contact the designated end-user by cell phone 115 to verify the nature of the alarm event.

Upon notice of the detected alarm event, the central panel 110, or the central station 140 may initiate an alarm entry delay before notifying the central station, or before the central station further communicates the alarm event detection, respectively. For example, a typical alarm entry delay in a home central security and monitoring system is about 45 seconds, or 1 minute. In order to verify by the FIG. 2 embodiment, the central panel opens a cell phone session with the end-user cell phone, and sends the video clip or a still photo to the end-user. By viewing the video, the end-user may respond by verifying that the alarm event is a true alarm event, or to clear it (verify that it was a false alarm event). If the entry/exit error (detected alarm event) or violation is cleared at the user's cell-phone, e.g., voice or keypad prior to the aforementioned alarm entry delay expiring, the central home panel cancels the exit/entry error or alarm, and ends the remote end-user cell-phone session. The alarm notification will therefore go no further than the central panel, avoiding the need to have security system personnel or local authorities investigate.

If the alarm entry delay is violated before verification, the central station 140 still sends or attempts to send the captured video or still photo to the end-user cell phone, if it has not already done so, to prompt hi/her to verify the nature of the detected event, or cancel (clear) the alarm using the various cell phone keys. If the detected alarm event is cleared but the alarm notification was already sent, the central station then suppresses the alarm. If the alarm event or event notification has not been reported outside of the central station to police or other responders, the central station cancels the reporting. Either the central panel or the central station may respond to the cancellation by generating and sending a new ID message which makes clear that there was an alarm event detected, and that the end-user canceled the alarm notification (verified the alarm event)via the cell phone connection.

Figure 3:
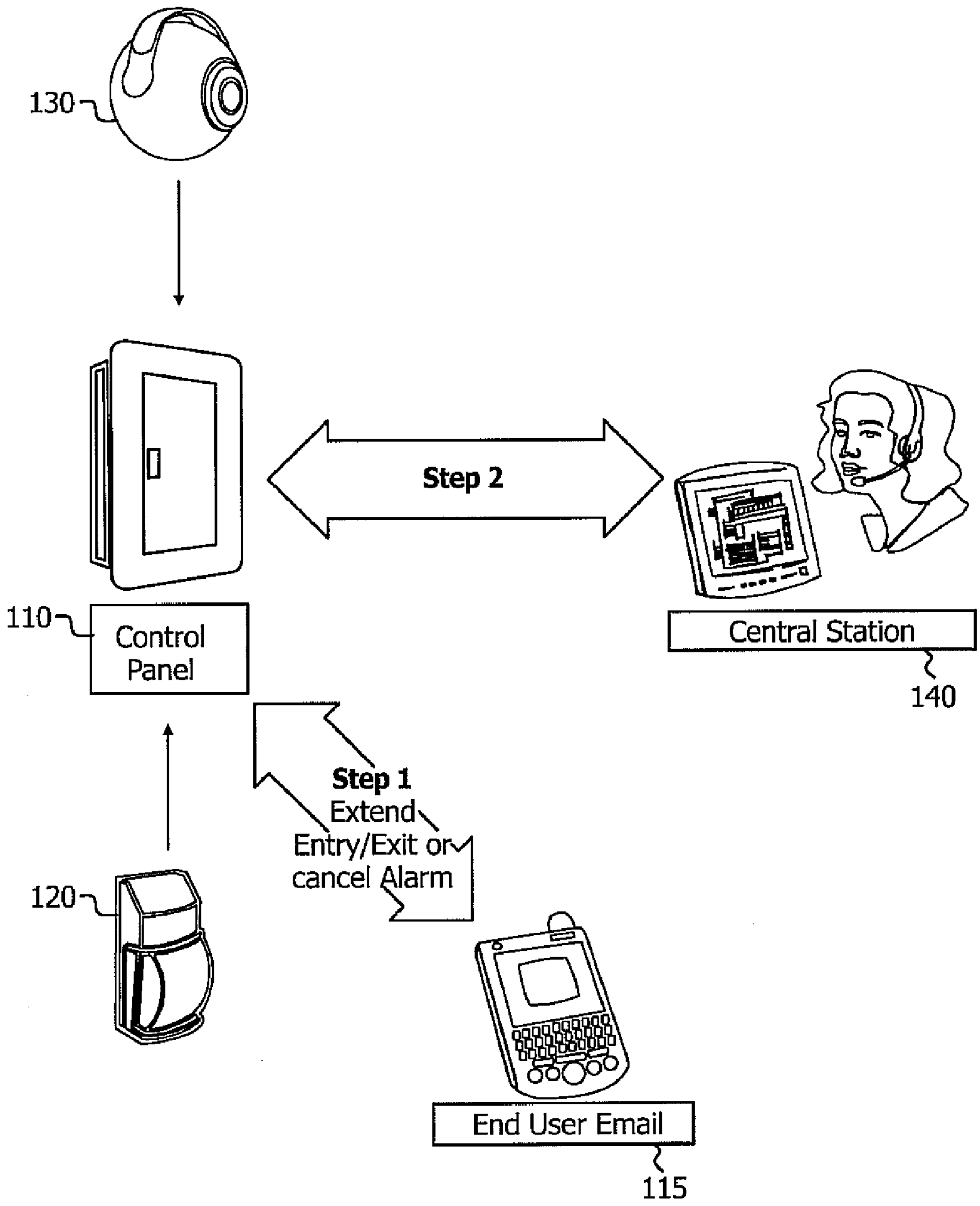
FIG. 3 is an alternative embodiment of the method of practicing the invention to verify detected alarm events.

FIG. 3 highlights inventive operation where the central panel 110 coordinates operation of the inventive user verification method automatically. That is, upon detection of an alarm event by an alarm detection device 120 in an alarm zone protected by video camera 130, central panel 110 attempts to or opens a cell phone session with a designated end-user (cell phone 115) before an alarm entry delay times out. Upon successful connection to the end-user cell phone, the central panel 110 may extend the alarm entry delay time (before formal alarm notification) as the end-user is alerted to the detected alarm event. The captured video is sent to the user for verification, where if verified as a false alarm event, alarm notification is canceled. In such operation, the central panel 110 receives this verification information and communicates to the central station 140.

The inventive system and method may further include the use of a "video zone list" that maps various alarm zones with the video monitoring device or multiple devices (e.g., network cameras) maintained therein. By use of the novel video zone list, if an alarm event or condition occurs, the source device that captured the video is readily identified by linking the alarm zone to the acquiring video monitoring device using the video zone list. Hence, the acquired video is instantly available for review or retransmission, whether for sending to the end-user cell-phone for prompt video verification, or for other uses Where the end-user is unable to verify the nature of the detected alarm event during a cell-phone session, the alarm is acknowledged remotely a true alarm event, and a verified alarm is raised.

FIG. 4A depicts a computer or microprocessor 145 located at the central panel 110 for controlling inventive operation. Computer 145 includes a set of computer readable instructions that when executed by the computer implements any of the methods, or operational steps of the invention. Where the inventive operation is controlled by central station 140 (as shown in FIG. 4B), executable computer-readable instructions that control inventive operation are executed by computer or microprocessor 145'.

FIG. 5 is a flow chart depicting one method for monitoring an alarm zone within a secured perimeter, border and/or building, to capture video image data of an alarm event detected in the alarm zone and establishing a cell phone session with an end-user to verify a nature of the detected alarm event (true or false). The method starts at block 510 in the figure, where block 520 represents a step of detecting an alarm event in the alarm zone. Block 530 represents a step of acquiring video data of the detected alarm event and block 540 represents a step of opening a communication session with the end-user by cell phone for communicating the alarm event, where the nature of the alarm event is verified. Block 550 represents the end of the process. The step of opening the communication session may be implemented at the central panel, before notification to the central monitoring station, or may be implemented and controlled by the central monitoring station.

As indicated hereinabove, it should be understood that the present invention could be realized in hardware, software, or a combination of hardware and software. Any kind of computer/server system(s)—or other apparatus adapted for carrying out the novel alarm verification methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, for example, the exemplary methods depicted in figures herein, and which product—when loaded in a computer system—is able to carry out these and related methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method for video monitoring an alarm zone in a perimeter, border and/or building, and automatically verifying by end-user cell phone whether alarm events detected in the alarm zone are true or false alarm events, the method comprising the steps of:

detecting an alarm event in the alarm zone;

acquiring video data of the detected alarm event in response to the detecting;

opening a communication session with an end-user by cell phone to communicate the alarm event detection to the end-user including forwarding the acquired video data so the end user can assess the captured alarm event and verify;

waiting a predetermined time period after the detected alarm event for receipt of an alarm event cancelation message from the end-user;

canceling the alarm event upon receipt of the alarm event cancelation message before expiration of the predetermined time period;

reporting the alarm event to a police department or other responders after the predetermined time period; and canceling the reported alarm event upon receipt of the alarm cancelation message after expiration of the predetermined time period.

2. The method for monitoring an alarm zone as set forth in claim 1, wherein the step of opening includes that the end-user verifies using a keypad of the cell phone.

3. The method for monitoring an alarm zone as set forth in claim 1, wherein the step of acquiring video data is triggered by a signal generated by an alarm event detection device located in the alarm zone.

4. The method for monitoring an alarm zone as set forth in claim 1, wherein the step of opening further includes initiating an alarm entry delay at alarm event detection, to delay communicating alarm event detection notification.

5. The method for monitoring an alarm zone as set forth in claim 4, wherein the alarm entry delay may be further extended where the communication session is opened but alarm event is not yet verified.

6. The method for monitoring an alarm zone as set forth in claim 1, wherein the step of opening is controlled by a central panel at the perimeter, border and/or building.

7. The method for monitoring an alarm zone as set forth in claim 1, wherein the alarm zone is an entry/exit point within the perimeter, border and/or building.

8. The method for monitoring an alarm zone as set forth in claim 5, wherein notification of the detected alarm event is automatically communicated to a central station monitoring location that operates to remotely monitor the perimeter, border and/or building.

9. The method for monitoring as set forth in claim 1, wherein the perimeter, border and/or building includes multiple alarm zones, and further includes a step of generating a video zone list to identify video monitoring devices which may be present in any of the multiple alarm zones.

10. The method for monitoring as set forth in claim 9, further including automatically identifying the video monitoring device has captured the detected alarm event, and therefore the acquired video data.

11. The method for monitoring as set forth in claim 9, wherein the acquired video data is instantly available to be forwarded to the end-user cell phone.

12. The method for monitoring as set forth in claim 1, wherein the step of opening includes that where an alarm event is verified as false, the alarm is cleared and the alarm event is not communicated.

13. The method for monitoring as set forth in claim 12, wherein the step of opening further includes that where the alarm event is verified as false, and an alarm report has not been prepared and communicated, the alarm event is cancelled and not communicated.

14. The method for monitoring as set forth in claim 12, wherein the step of opening further includes that wherein the alarm event is verified as false, an ID message is generated at a central home panel associated with the alarm zone and forwarded to a central station communicating that an alarm event was detected, that the detected alarm event was verified by an end-user as a false alarm event, and cancelled by the end-user.

15. A computer program product stored on a computer usable medium, comprising computer readable instructions that when operated upon by a computer perform the method steps for monitoring as set forth in claim 1.

16. A central security monitoring and alarm system for monitoring to secure a building, perimeter or other premises ("the secured premises"), comprising:

at least one video monitor located in at least one alarm zone in the secured premises arranged to acquire video data of alarm events detected in the alarm zone; and a central panel arranged at the secured premises in communication with the at least one video monitor;

wherein upon alarm event detection, the at least one video monitor captures video data of the detected alarm event, and the central panel automatically initiates a communication session with an end-user cell phone to forward the captured detected alarm event video data to the end-user cell-phone to verify whether the detected alarm event is a true or a false detected alarm event and wherein the central panel waits a predetermined time period after alarm event detection for receipt of a false detected alarm message from the end-user, cancels the alarm event upon detecting the false alarm message before expiration of the predetermined time period, notifies a police department or other responder after that, and cancels the notification upon detecting the false alarm message after expiration of the predetermined time period.

17. The central security monitoring and alarm system as set forth in claim 16, wherein verification occurs using the end-user cell phone keypad during an initiated communication session.

18. The central security monitoring and alarm system as set forth in claim 16, wherein an alarm entry delay is initiated at alarm event detection.

19. The central security monitoring and alarm system as set forth in claim 18, wherein the alarm entry delay is extended upon communication session initiation.

20. The central security monitoring and alarm system as set forth in claim 16, further comprising a video zone list that maps video monitors to alarm zones to automatically identify a video monitor and any video data captured therefrom.

21. The security monitoring and alarm system as set forth in claim 20, wherein the captured video data is directed by the central panel to the end-user cell phone through a central monitoring station.

22. The security and monitoring system as set forth in claim 21, the central monitoring station is automatically notified of a detected alarm event, and the captured video data is automatically forwarded to the central monitoring station.

23. The central security monitoring and alarm system as set forth in claim 20, wherein the captured video data is directed by the central panel to the end-user cell phone at successful initiation of the communication session.

24. The central security monitoring and alarm system as set forth in claim 16, wherein the secured premises include a private home.

25. The central security monitoring and alarm system as set forth in claim 16, wherein the secured premises includes building, perimeter or other premises comprising a public, private or government organization.

26. The central security monitoring and alarm system as set forth in claim 25, wherein organization may comprise a small or large business enterprise.

* * * * *